(12) United States Patent
Kato et al.

(10) Patent No.: US 10,618,765 B2
(45) Date of Patent: Apr. 14, 2020

(54) IMAGE FORMING SYSTEM AND IMAGE FORMING APPARATUS

(71) Applicant: CANON KABUSHIKI KAISHA, Tokyo (JP)

(72) Inventors: Hiroki Kato, Gotemba (JP); Atsushi Ogata, Mishima (JP); Kazushi Ino, Suntou-gun (JP); Motohiro Furusawa, Shizuoka (JP); Koji Kawamura, Yokohama (JP); Ichiro Yasumaru, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 42 days.

(21) Appl. No.: 15/488,688

(22) Filed: Apr. 17, 2017

(65) Prior Publication Data

US 2017/0308021 A1  Oct. 26, 2017

(30) Foreign Application Priority Data

Apr. 21, 2016  (JP) .................. 2016-085427

(51) Int. Cl.
B65H 29/60 (2006.01)
H04N 1/00 (2006.01)
(Continued)

(52) U.S. Cl.
CPC ............ B65H 29/60 (2013.01); B65H 7/02 (2013.01); B65H 43/00 (2013.01); B65H 85/00 (2013.01);
(Continued)

(58) Field of Classification Search
CPC . B65H 5/26; B65H 5/36; B65H 29/58; B65H 29/60; B65H 85/00; B65H 2301/5144; B65H 2301/5305; B65H 2301/332; B65H 2301/333; B65H 2404/1361; B65H 2404/63; B65H 2515/40; G03G 15/5062; G03G 15/6573; G03G 2215/00569; G03G 2215/00928; G03G 2215/0094
(Continued)

(56) References Cited

U.S. PATENT DOCUMENTS 6,325,371 B1  12/2001  Araki et al.
6,804,473 B2  10/2004  Nakamura et al.
(Continued)

FOREIGN PATENT DOCUMENTS

JP  2002-209055 A  7/2002
JP  2004-045723 A  2/2004
(Continued)

OTHER PUBLICATIONS

Office Action dated Dec. 20, 2019, in Japanese Patent Application No. 2016-085427.

*Primary Examiner* — Prasad V Gokhale
(74) *Attorney, Agent, or Firm* — Venable LLP

(57) ABSTRACT

A discharge unit discharges a sheet having an image thereon. A switching unit switches between stacking the sheet discharged from the discharge unit on a stacking unit or conveying the sheet from the discharge unit toward an image reading apparatus. A conveyance unit conveys the sheet conveyed via the switching unit to a reading unit. A cooling unit cools the sheet discharged from the discharge unit or cools the reading unit.

5 Claims, 8 Drawing Sheets

(51) Int. Cl.
*G03G 15/00* (2006.01)
*G03G 15/23* (2006.01)
*G03G 21/20* (2006.01)
*B65H 43/00* (2006.01)
*B65H 85/00* (2006.01)
*B65H 7/02* (2006.01)

(52) U.S. Cl.
CPC ......... *G03G 15/23* (2013.01); *G03G 15/5062* (2013.01); *G03G 15/60* (2013.01); *G03G 15/6529* (2013.01); *G03G 15/6538* (2013.01); *G03G 15/6552* (2013.01); *G03G 15/6573* (2013.01); *G03G 21/206* (2013.01); *H04N 1/00* (2013.01); *H04N 1/0057* (2013.01); *H04N 1/00814* (2013.01); *H04N 1/00978* (2013.01); *B65H 2301/33312* (2013.01); *B65H 2301/5144* (2013.01); *B65H 2301/5305* (2013.01); *B65H 2404/63* (2013.01); *B65H 2511/30* (2013.01); *B65H 2511/414* (2013.01); *B65H 2515/40* (2013.01); *B65H 2801/06* (2013.01); *B65H 2801/39* (2013.01); *G03G 2215/00928* (2013.01)

(58) Field of Classification Search
USPC .................. 271/65, 301, 303, 291, 185, 186
See application file for complete search history.

(56) References Cited

U.S. PATENT DOCUMENTS

| | | | |
|---|---|---|---|
| 6,826,374 B2 | 11/2004 | Kato et al. | |
| 7,050,751 B2 | 5/2006 | Watanabe et al. | |
| 7,395,023 B2 * | 7/2008 | Kitaoka | G03G 15/605 399/361 |
| 8,061,712 B2 | 11/2011 | Tsuji et al. | |
| 8,382,109 B2 | 2/2013 | Tsuji et al. | |
| 8,720,886 B2 | 5/2014 | Kuroda et al. | |
| 8,870,182 B2 | 10/2014 | Ogata et al. | |
| 9,071,712 B2 | 6/2015 | Ino et al. | |
| 9,203,994 B2 | 12/2015 | Kato et al. | |
| 9,521,282 B2 | 12/2016 | Kato et al. | |
| 2007/0216083 A1 * | 9/2007 | Kawashima | B65H 5/00 271/97 |
| 2008/0044213 A1 * | 2/2008 | Kato | G03G 15/6573 399/405 |
| 2011/0013961 A1 * | 1/2011 | Torimaru | B65H 3/44 400/582 |
| 2012/0063790 A1 * | 3/2012 | Ogawa | B65H 5/26 399/16 |
| 2013/0293909 A1 | 11/2013 | Endo et al. | |
| 2014/0029999 A1 * | 1/2014 | Masuta | G03G 15/6552 399/405 |
| 2014/0079457 A1 * | 3/2014 | Nakajima | G03G 15/6529 399/367 |
| 2014/0320939 A1 | 10/2014 | Ogata et al. | |
| 2017/0305711 A1 * | 10/2017 | Ogata | B65H 85/00 |

FOREIGN PATENT DOCUMENTS

| | | |
|---|---|---|
| JP | 2004-106999 A | 4/2004 |
| JP | 2006-047474 A | 2/2006 |
| JP | 2006-232467 A | 9/2006 |
| JP | 2010-074624 A | 4/2010 |
| JP | 2010-181632 A | 8/2010 |
| JP | 2010-243616 A | 10/2010 |
| JP | 2011-191544 A | 9/2011 |
| JP | 2014-112237 A | 6/2014 |
| JP | 2015-039814 A | 3/2015 |

* cited by examiner

IMAGE FORMING SYSTEM AND IMAGE FORMING APPARATUS

BACKGROUND OF THE INVENTION

Field of the Invention

The present invention relates to an image forming apparatus and an image forming system such as a copying machine or a multifunction peripheral (MFP) having an original reading function.

Description of the Related Art

Although an image forming apparatus such as a copying machine has a reading unit and an image forming unit, generally a conveyance path for conveying an original to the reading unit and a conveyance path for conveying a recording material to the image forming unit are independent. According to Japanese Patent Laid-Open No. 2006-232467, using a conveyance path of a recording material for performing a double-sided print also as a conveyance path for conveying an original is proposed. By virtue of the invention of Japanese Patent Laid-Open No. 2006-232467, it is possible to provide a low cost, compact image forming apparatus since the image forming unit and the reading unit share a conveyance path.

Incidentally, there is a market need in that there is a desire to read by a reading unit as an original a recording material on which the image forming unit formed an image. Because the image forming unit and the reading unit share a conveyance path, it is possible for the invention recited in Japanese Patent Laid-Open No. 2006-232467 to read the recording material if it is improved so that a recording material outputted from the image forming unit is guided to the reading unit. However, it is expected that the recording material will become hot within the image forming apparatus, which adds heat when an image is formed on the recording material, and will cause the reading unit to heat up, and that the read accuracy will thereby decrease.

SUMMARY OF THE INVENTION

Accordingly, the present invention provides an image forming system capable of reading with good accuracy by an image reading apparatus a sheet on which an image is formed by the image forming apparatus.

The present invention provides an image forming system including an image forming apparatus that forms an image on a sheet and an image reading apparatus that reads an image formed on a sheet. The system may comprise the following elements. An image forming unit is arranged in the image forming apparatus and is configured to form an image on a sheet. A discharge unit is configured to discharge the sheet on which the image is formed by the image forming unit. A stacking unit is configured to stack the sheet discharged by the discharge unit. A switching unit is configured to switch between stacking the sheet discharged from the discharge unit on the stacking unit or conveying the sheet discharged from the discharge unit toward the image reading apparatus. A feeding unit is arranged in the image reading apparatus and configured to feed a sheet. A main conveyance path is configured to convey the sheet fed by the feeding unit. A reading unit is configured to read the sheet conveyed through the main conveyance path. A conveyance unit is configured to convey the sheet conveyed via the switching unit to the reading unit. A cooling unit is configured to cool the sheet discharged from the discharge unit of the image forming apparatus and conveyed to the reading unit, or to cool the reading unit.

Further features of the present invention will become apparent from the following description of exemplary embodiments (with reference to the attached drawings).

DESCRIPTION OF THE EMBODIMENTS

A sheet on which an image is formed by an image forming apparatus is guided to an image reading apparatus and the sheet is read by an image sensor arranged within the image reading apparatus. In particular, a cooling unit that cools the sheet or cools the image sensor in order to suppress a temperature rise of the image sensor is employed. A method for conveying a sheet at a low speed (including suspension) so that the temperature of the sheet decreases or a cooling fan or the like for cooling the image sensor or the sheet, as a cooling unit, are employed for example. Note, a sheet is a concept that includes not only a sheet on which an image is formed (example: an original), but also a sheet on which an image is not formed (example: a recording material). Also, the recording material may be called a recording medium, a sheet, a transfer material, or a transfer sheet.

Figure 1:
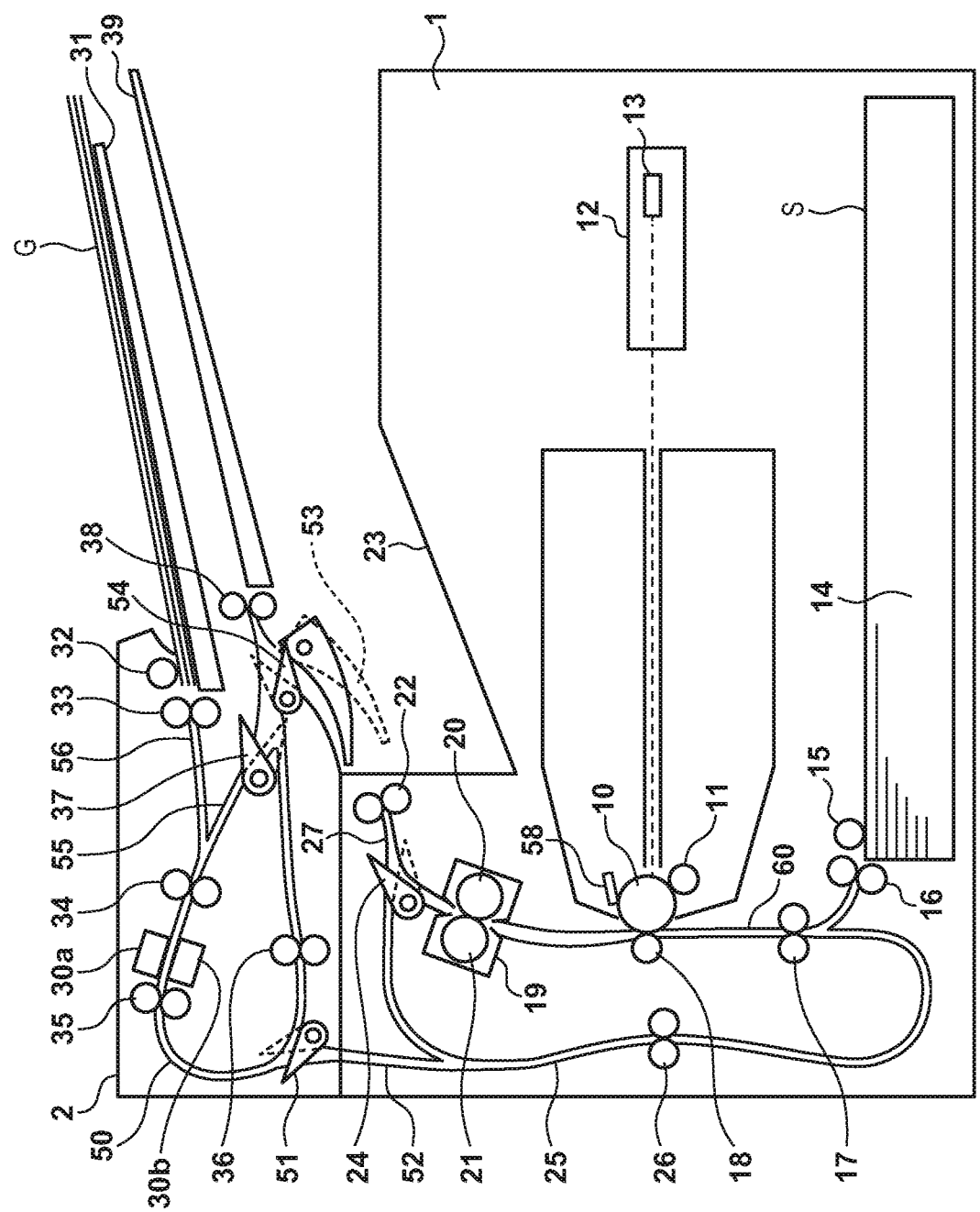
FIG. 1 is an overview cross-sectional view of an image forming system.

FIG. 1 is an overview cross-sectional view illustrating an image forming system 100 having an image reading apparatus 2 and an image forming apparatus 1. The image forming system 100 may also be called a copying machine or a multifunction peripheral. Although an electrophotographic type laser beam printer is employed as the image forming apparatus 1 in the present embodiment, another image formation process method using heat such as a thermal transfer method may be employed. The image reading apparatus 2 employs a sheet-through method image scanner that reads an original by image sensors while the original is conveyed (sub-scanning) by an automatic document feeder (ADF).

Image Forming Process

The image forming apparatus 1 is a printer engine that forms a toner image by an electrophotographic process in FIG. 1. A photosensitive drum 10 is a rotatable image carrier for carrying an electrostatic latent image or a toner image and functions as the main portion of an image forming unit. A charger 58 causes the front surface of the photosensitive drum 10 to be uniformly charged. A light emitting unit 13 that an optical scanner 12 is equipped with forms an electrostatic latent image by emitting a laser beam according to an image signal onto the photosensitive drum 10 while main scanning. The optical scanner 12 may be called an exposure unit. A developing roller of a developer 11 develops an electrostatic latent image by using toner and generates a toner image.

A recording material S set in a first feeding unit 14 is conveyed by a paper feed roller 15 and a separating unit 16 one at a time to registration rollers 17. The registration rollers 17 convey the recording material S to a transfer unit 18 so that a timing at which the toner image carried on the photosensitive drum 10 reaches the transfer unit 18 and a timing at which the recording material S reaches the transfer unit 18 match. The transfer unit 18 and the photosensitive drum 10 form a nip unit for transferring the image. The transfer unit 18 transfers the toner image on the photosensitive drum 10 to the recording material S by an applied bias and pressure. Furthermore, the recording material S is conveyed to a fixing unit 19. The fixing unit 19 adds heat to the toner image and the recording material S by a heating roller 20. Furthermore, the fixing unit 19 causes the toner image to be fixed to the recording material S by adding pressure to the toner image and the recording material S by the heating roller 20 and a pressure roller 21. The heating roller 20 has a heater and a thermistor, and control is performed so that the heater becomes a predetermined fixing temperature. Discharging rollers 22 discharge the recording material S on which the toner image is fixed to a first discharge unit 23. The first discharge unit 23 may also be called a discharge tray. Note, the photosensitive drum 10, the optical scanner 12, the developer 11, and the transfer unit 18 form the image forming unit (station).

The conveyance path connecting from the first feeding unit 14 to the first discharge unit 23 is called a first main conveyance path 60. The first main conveyance path 60 has a feeding section from the first feeding unit 14 to the registration rollers 17, a main section from the registration rollers 17 to a flapper 24, and a discharging section from the flapper 24 to the discharging rollers 22. The discharging section is called a discharge path 27. The discharging rollers 22 have a discharge mode for discharging the recording material S to the first discharge unit 23 by a forward rotation, a reverse mode for reversing the conveyance direction of the recording material S by a reverse rotation and sending the recording material S to a first sub conveyance path 25. In this way, the discharging rollers 22 also function as a reversing unit. Regarding an original G supplied from the image reading apparatus 2 to the image forming apparatus 1 via a contact path 52, the discharging rollers 22 may discharge or reverse the original G. The front surface and the back surface of the recording material S are switched by reversing the conveyance direction of the recording material S. The reversing unit functions when it is necessary to switch the front surface and the back surface of the recording material S such as when a double-sided print is instructed. The rotation direction of the discharging rollers 22 may be switched by a switching mechanism such as a clutch or a gear, and a motor itself which is a driving source may be switched by rotating in reverse. The flapper 24 is arranged between the fixing unit 19 and the discharging rollers 22. The flapper 24 moves between an initial position (first position) illustrated by the solid line and a position (second position) indicated by the broken line in FIG. 1. Alternatively, the flapper 24 may be biased by an elastic member in a clockwise direction such that the position indicated by the broken line in FIG. 1 is the initial position. In such a case, the flapper 24 moves to the position indicated by the solid line in FIG. 1 being pushed open by the leading edge of the recording material S. When single-sided printing is instructed, the recording material S passes through the flapper 24 and reaches the discharging rollers 22, and is discharged to the first discharge unit 23 as is. In a double-sided print, when the image is printed on the first side of the recording material S and the trailing edge of the recording material S passes through the flapper 24, the flapper 24 is switched to the position illustrated by the broken line then the discharging rollers 22 rotate in reverse. The recording material S conveyed in a reverse direction by the discharging rollers 22 is guided to the first sub conveyance path 25 by the flapper 24. The first sub conveyance path 25 is a conveyance path from the flapper 24 to the registration rollers 17 (a confluence portion with the first main conveyance path 60). After this, the recording material S is conveyed by conveyance rollers 26 to the registration roller 17. The second side of the recording material S opposes the photosensitive drum 10 because the front and back of the recording material S are reversed in the reversing unit. A toner image is transferred to the second side by the transfer unit 18. The fixing unit 19 causes the image to be fixed on the second side. After this, the discharging rollers 22 discharge the recording material S to the first discharge unit 23. In this way, the first main conveyance path 60 and the first sub conveyance path 25 form a circulating path that the recording material S circulates in. The circulating path has a reversing unit, is approximately ring-shaped, and the front and back of the recording material S are reversed whenever the recording material S makes one round.

Original Reading Process

In FIG. 1, the image reading apparatus 2 is equipped with a second feed unit 31 on which the original G is placed, a paper feed roller 32 and a separating unit 33 that send one at a time the original G placed on the second feed unit 31. The second feed unit 31 may also be called a paper feed tray. A second main conveyance path 50 is a conveyance path from the paper feed roller 32 to discharging rollers 38. In particular, the section from the paper feed roller 32 to conveyance rollers 34 is called a feed path 56. An image sensor 30a that reads the top surface side and an image sensor 30b that reads the bottom surface side of the original G are arranged in the second main conveyance path 50. The image sensors 30a and 30b are CIS (contact image sensors) or the like, and have a photoelectric conversion element such as a CMOS sensor or a CCD sensor. Also, the conveyance rollers 34, 35, and 36 and the discharging rollers 38 that convey the original G are arranged in the second main conveyance path 50. The discharging rollers 38 discharge the original G to a second discharge unit 39. The second discharge unit 39 may also be called a discharge tray. A flapper 37 is arranged at the front of the discharging rollers 38. The flapper 37 moves between an initial position (first position) illustrated by the solid line and a position (second position) indicated by the broken line in FIG. 1. Alternatively, the flapper 37 may be biased by an elastic member in a clockwise direction such that the position indicated by the broken line in FIG. 1 is the initial position. In such a case, the flapper 37 moves to the position indicated by the solid line being pushed open by the leading edge of the recording material S. The rotation direction of the discharging rollers 38 can be reversed. The original G placed on the second feed unit 31 passes through the image sensors 30a and 30b conveyed by the conveyance rollers 34 after being fed one at a time by the paper feed roller 32 and the separating unit 33, and the front surface (top surface) and the back surface (bottom surface) of the original G are read. The original G that passed through the image sensors 30a and 30b is conveyed by the conveyance rollers 35 and the conveyance rollers 36 to the discharging rollers 38. The flapper 37 exists at an initial position when the trailing edge of the original G passes through the flapper 37. The original G that reached the discharging rollers 38 is discharged to the second discharge unit 39 by the discharging rollers 38.

The image reading apparatus 2 can read both sides of the original G even if the image sensor 30b is omitted. The original G whose front surface was read by the image sensor 30a is guided to the discharging rollers 38 by flappers 51, 37, and 54. When the trailing edge of the original G passes the flapper 37, the flapper 37 moves to the broken line position. The discharging rollers 38 start rotating in reverse and the original G is guided to the image sensor 30a via a second sub conveyance path 55 by the flapper 37. The image sensor 30a can read the back surface of the original G because the conveyance direction of the original G is reversed by the discharging rollers 38 rotating in reverse.

Overwriting Print Process

The process for forming an image onto the original G on which an image is already formed is called an overwriting print process. The flapper 51 is arranged in the middle of the second main conveyance path 50. The flapper 51 guides the original G to the discharging rollers 38 by moving to the position indicated by the solid line. The flapper 51 guides the original G to the contact path 52 by moving to the position indicated by the broken line. The second main conveyance path 50 branches to a conveyance path towards the discharging rollers 38 and the contact path 52 which is a conveyance path towards the image forming apparatus 1 as FIG. 1 illustrates. The flapper 51 is arranged at the branch portion. The contact path 52 converges or connects to the first sub conveyance path 25 within the image forming apparatus 1.

Direct Print Mode

Figure 2A:
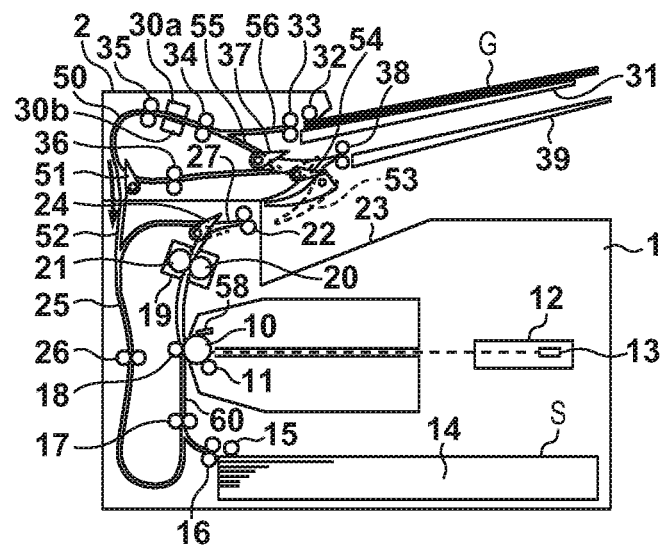
FIGS. 2A to 2C are views illustrating examples of conveying a sheet.

The original G is conveyed to the first sub conveyance path 25 of the image forming apparatus 1 through the contact path 52 when the flapper 51 exists at the position indicated by FIG. 2A. The original G is conveyed to the registration rollers 17 by the conveyance rollers 26 and the image on the original G is overwritten (image formation process) by the photosensitive drum 10. In this way, the original G is guided to the contact path 52 by the flapper 51 switching to the broken line position and the image on the original G is overwritten when the original G read by the image sensors 30a and 30b reaches the flapper 51.

Temporary Wait Mode (Reversal of Conveyance Direction/Reversal of Front and Back)

Figure 2B:
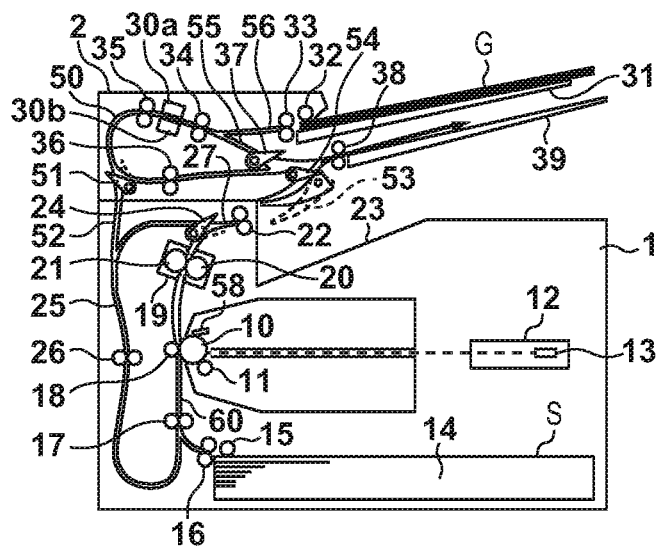
Figure 2C:
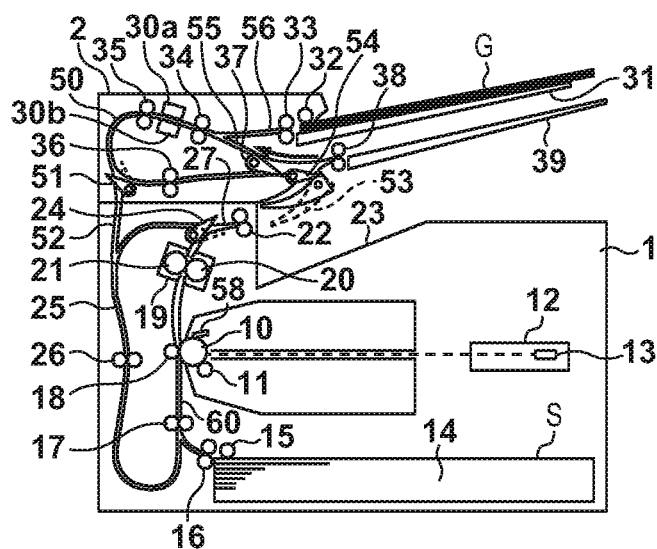

Prior to the original G being conveyed to the image forming apparatus 1, it is possible to cause a temporary wait in the image reading apparatus 2. The original G read by the image sensors 30a and 30b is guided to the discharging rollers 38 by the flapper 51 held in advance at the solid line position of FIG. 1. The original G is caused to wait by the discharging rollers 38 temporarily stopping conveyance of the original G when the trailing edge of the original G passes the flapper 37 as FIG. 2B illustrates. It is possible to save time for generating content for which overwriting printing is performed by analyzing image information of the read original G while waiting. For example, the image forming system 100 may obtain an identification number printed on the original G and download image data associated in advance with the identification number from a server or the like. After this, the flapper 37 moves to the solid line position indicated in FIG. 2B. The rotation direction of the discharging rollers 38 is switched from forward rotation to reverse rotation and the original G is guided to the second sub conveyance path 55 as FIG. 2C illustrates. The original G converges to the second main conveyance path 50 again via the second sub conveyance path 55. The second sub conveyance path 55 connects to the second main conveyance path 50 upstream of the conveyance rollers 34 in the conveyance direction. After this, the flapper 51 moves to the broken line position of FIG. 1 and the original G is guided to the contact path 52 as FIG. 2A illustrates when the original G again reaches the flapper 51. By this, an image is formed onto the original G.

Recording Material S Read Process

Figure 3A:
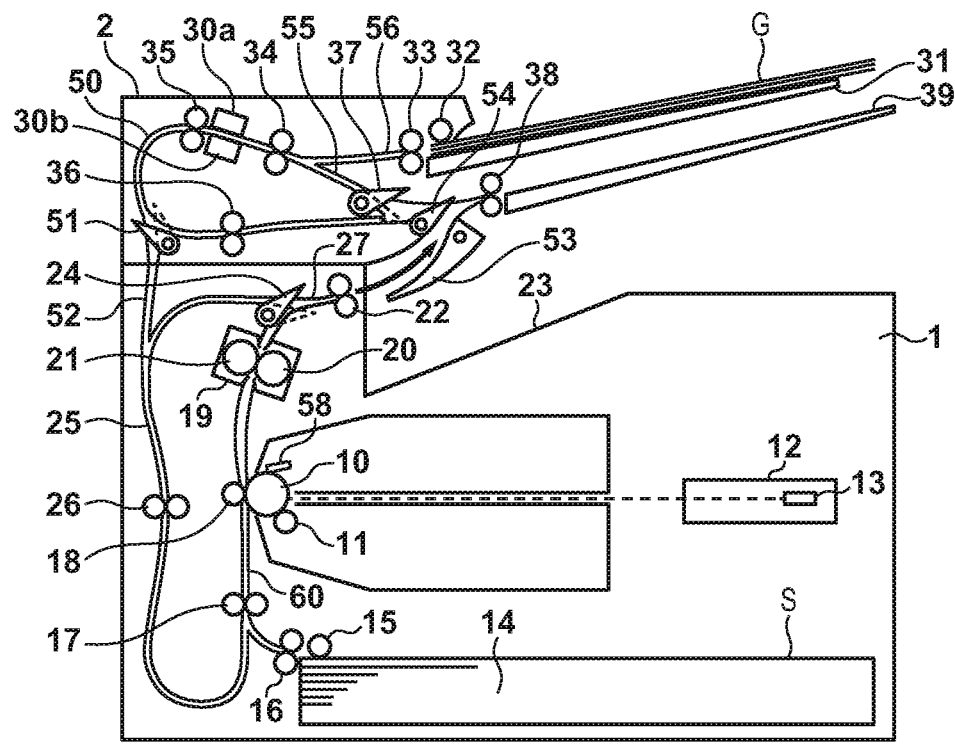
FIGS. 3A and 3B are views illustrating examples of conveying a sheet.
Figure 3B:
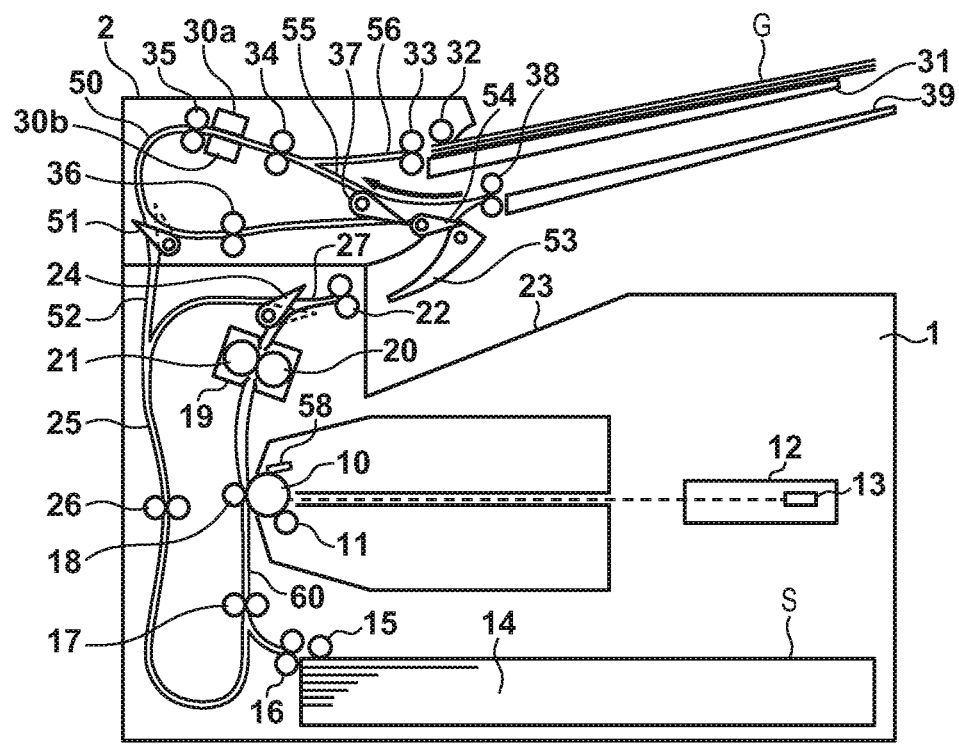

In FIG. 1, a flapper 53 is arranged downstream of the discharging rollers 22 and above the first discharge unit 23. The flapper 53 is a guiding member that guides the recording material S and is a main member that forms a guiding conveyance path. The flapper 53 moves between a discharge position (solid line) in which the recording material S discharged by the discharging rollers 22 is guided to the first discharge unit 23 and an intercept position (broken line) in which the recording material S is intercepted and guided to the image reading apparatus 2. The flapper 53 guides the recording material S to the discharging rollers 38 of the image reading apparatus 2 in the case of the latter as FIG. 3A illustrates. A flapper 54 moves between a position in which it guides the original G conveyed via the second main conveyance path 50 to the discharging rollers 38 and a position in which it guides the recording material S discharged from the image forming apparatus 1 via the flapper 53 to the discharging rollers 38. When the trailing edge of the recording material S passes the flapper 54, the flapper 37 moves to the broken line position and the flapper 54 moves to the solid line position as FIG. 1 illustrates. Furthermore, the discharging rollers 38 switch from a forward rotation to a reverse rotation. By this, the recording material S is sent to the image sensors 30a and 30b via the second sub conveyance path 55 and the second main conveyance path 50 as FIG. 3B illustrates. The image sensors 30a and 30b read the front surface and the back surface of the recording material S. After this, the recording material S is sent to the discharging rollers 38 by the flapper 51 and the conveyance rollers 36, and is discharged and stacked on the second discharge unit 39 by the discharging rollers 38.

Combination of the Read Process of the Recording Material S and the Overwriting Print Process to the Original G Here, it is assumed that only the image sensor 30b which reads the bottom surface side of the original G is arranged in the image reading apparatus 2. For the recording material S on which an image is formed on both sides, both sides are read by the image sensor 30b.

The process in which an image is formed on the first side of the recording material S up until the first side is read is the same as the read process of the recording material S. In other words, the recording material S on which the image is formed on the first side is guided to the discharging rollers 38 by the flapper 53 and is sent to the image sensor 30b by the discharging rollers 38. At that point in time, the first side on which the image is formed faces downward and opposes the image sensor 30b. The recording material S is guided to the contact path 52 by the flapper 51 in order to form an image on the second side of the recording material S whose first side was read as FIG. 2A illustrates. The recording material S is conveyed to the first main conveyance path 60 via the first sub conveyance path 25 and is sent to the nip unit by the registration rollers 17. The recording material S on which an image is formed on the second side by the nip unit is conveyed to the discharging rollers 38 by the discharging rollers 22, the flapper 53, and the flapper 54 as FIG. 3A illustrates. When the trailing edge of the recording material S passes the flapper 54, the flapper 54 is switched, and then the discharging rollers 38 start rotating in reverse. The recording material S again passes the image sensor 30b and the second side of the recording material S is read by the image sensor 30b as FIG. 3B illustrates. After this, the recording material S is sent again to the discharging rollers 38 by the flapper 51 and the conveyance rollers 36, is discharged to the second discharge unit 39 by the discharging rollers 38 and stacked thereon.

Control Unit

Figure 4:
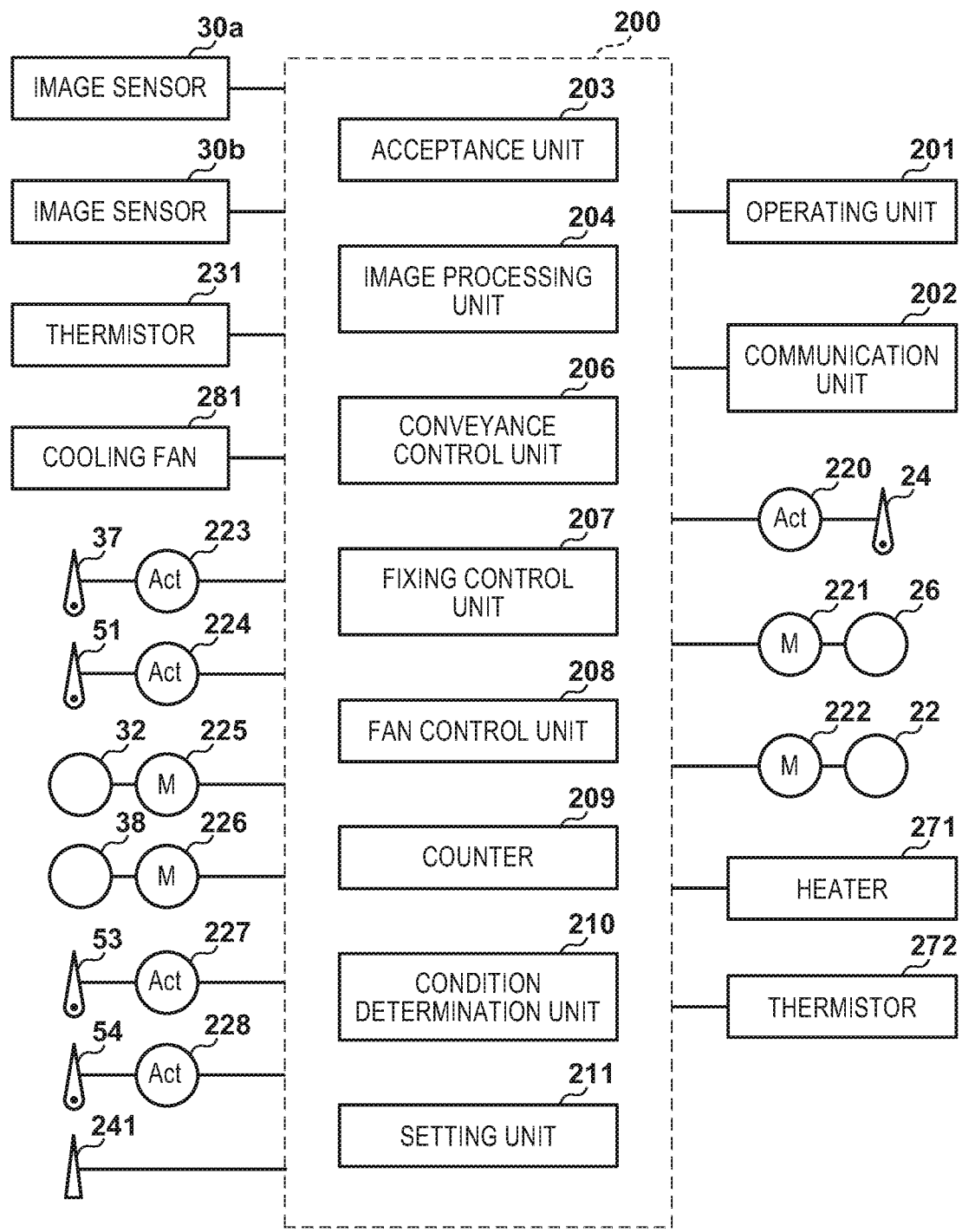
FIG. 4 is a block diagram illustrating a control unit.

FIG. 4 illustrates a control unit 200 that controls the image forming system 100. A plurality of functions that the control unit 200 is equipped with may be implemented by a CPU executing a control program stored in a storage apparatus, and may be implemented by an ASIC (application specific integrated circuit) or an FPGA (field-programmable gate array). Also, each function of the control unit 200 may be implemented by a mixture of these. In other words, some functions may be implemented by software and the remaining functions may be implemented by hardware.

An operation unit 201 and a communication unit 202 are connected to the control unit 200. The operation unit 201 has an input unit for inputting instructions from an operator and a display unit for displaying information and operation menus to the operator. The communication unit 202 connects to a host computer, receives instructions from the operator, and receives image data. An acceptance unit 203 accepts instructions inputted from the operation unit 201 or the communication unit 202. An image processing unit 204 generates image data from image signals obtained by reading the original G by the image sensors 30a and 30b. A conveyance control unit 206 controls the position of the flapper 24 by driving an actuator 220. The conveyance control unit 206 causes the conveyance rollers 26 to rotate by driving a motor 221. The conveyance control unit 206 causes the discharging rollers 22 to rotate by driving a motor 222. Note, motors 221 and 222 may be unified as a single driving source in a case when the reversal mechanism described above is employed. The conveyance control unit 206 controls the position of the flapper 37 by driving an actuator 223. The conveyance control unit 206 controls the position of the flapper 51 by driving an actuator 224. The conveyance control unit 206 causes the paper feed roller 32, the separating unit 33, and the conveyance rollers 34 to rotate by driving a motor 225. The conveyance control unit 206 causes the discharging rollers 38 to rotate by driving a motor 226. Note, motors 225 and 226 may be unified as a single driving source in a case in which the reversal mechanism described above is employed. The conveyance control unit 206 controls the position of the flapper 53 by driving an actuator 227. The conveyance control unit 206 controls the position of the flapper 54 by driving an actuator 228. A fixing control unit 207 determines a target fixing temperature in accordance with the type (example: thick paper/thin paper) of recording material S or a control mode accepted by the acceptance unit 203. The fixing control unit 207 detects the temperature (fixing temperature) of the fixing unit 19 by a thermistor 272 and controls the power supplied to a heater 271 so that the detected temperature is the target fixing temperature. A fan control unit 208 controls a cooling fan 281 for cooling the recording material S and the image sensors 30a and 30b. The fan control unit 208 and the cooling fan 281 are optional. A sheet sensor 241 is arranged in the conveyance path and is a sensor that detects a sheet such as the recording material S or the original G. The sheet sensor 241 detects a sheet passing though the feed path 56 or the discharge path 27, for example. A counter 209 counts the number of recording materials S conveyed from the image forming apparatus 1 to the image reading apparatus 2.

A condition determination unit 210 determines whether or not a predetermined cooling condition is satisfied. A setting unit 211 sets a cooling effect of a cooling mechanism higher when the predetermined cooling condition is satisfied and sets the cooling effect of the cooling mechanism lower when the predetermined cooling condition is not satisfied (the cooling mechanism may be disabled or stopped).

Cooling Control (Temperature Rise Suppression Control)

The predetermined cooling condition described above is a condition for causing the cooling mechanism to activate or for enhancing the cooling effect of the cooling mechanism. The cooling condition is determined in advance so that the image sensors 30a and 30b can read an image with good accuracy.

When the recording material S, which is heated by the fixing unit 19 of the image forming apparatus 1 and is in a high temperature state, passes through the image sensors 30a and 30b, the temperature of the image sensors 30a and 30b rises by heat propagating from the recording material S. There are cases when this causes the image read accuracy to decrease. Accordingly, a temperature rise of the image sensors 30a and 30b that would cause the read accuracy to decrease is suppressed in the present embodiment.

Cooling Condition Focused on Passing Position of Sheet

A condition that can be employed as the cooling condition is that the recording material S on which an image is formed by the image forming apparatus 1 is conveyed to the image sensors 30a and 30b for example. The original G does not satisfy the cooling condition if it is fed from the second feed unit 31 and conveyed to the image sensors 30a and 30b without going through the image forming apparatus 1. Accordingly, the sheet sensor 241 may be employed in order to identify whether or not a sheet such as the recording material S or the original G passed the fixing unit 19. For example, the sheet sensor 241 is arranged in the discharge path 27 which is a conveyance path through which the recording material S, which passed the fixing unit 19, passes. The condition determination unit 210, by using the sheet sensor 241, detects that a sheet on which an image has been formed by the fixing unit 19 is conveyed to the image sensors 30a and 30b. For example, the condition determination unit 210 determines that the cooling condition is satisfied (a sheet is in a high temperature state) when the sheet sensor 241 detects a sheet, and determines that the cooling condition is not satisfied when the sheet sensor 241 does not detect a sheet. Note, the sheet sensor 241 may be arranged on the flapper 24 or the flapper 53.

Meanwhile, the sheet sensor 241 may be arranged in the feed path 56. The original G fed from the second feed unit 31 passes through the feed path 56 and passes through the image sensors 30a and 30b. Accordingly, it is estimated that a sheet that passed through the feed path 56 is not a sheet discharged from the image forming apparatus 1. Accordingly, the condition determination unit 210 may determine that the cooling condition is not satisfied when the sheet sensor 241 detects a sheet in the feed path 56 (a sheet not in a high temperature state) and may determine that the cooling condition is satisfied when the sheet sensor 241 does not detect a sheet in the feed path 56.

Cooling Condition Based on Control Modes

The image reading apparatus 2 has a plurality of control modes. A reading mode for reading the original G, a reading mode for reading the recording material S, and an overwrite print mode to the original G are included in these. In particular, the recording material S which is in a high temperature state passes through the image sensors 30a and 30b in the reading mode for reading the recording material S. Accordingly, a cooling condition may be that the acceptance unit 203 accepts a setting (designate/instruct) of the reading mode for reading the recording material S. In other words, the condition determination unit 210 determines that the cooling condition is satisfied when the reading mode for reading the recording material S is accepted. The condition determination unit 210 determines that the cooling condition is not satisfied because the recording material S in a high temperature state does not pass through the image sensors 30a and 30b when another control mode is selected. Here, the reading mode of the original G is a mode in which a read process for reading the original G is executed. The reading mode of the recording material S is a mode in which a read process for reading the recording material S is executed. The overwrite print mode to the original G is a mode in which an overwriting print process to the original G is executed. These three reading modes merely examples and a reading mode for performing a read process that is different from these may also be employed.

A Cooling Condition Based on the Number of Sheets that Passed Through the Fixing Unit The temperature of the image sensors 30a and 30b rises the more the number of sheets supplied to the image sensors 30a and 30b after passing through the fixing unit 19 increases. Accordingly, the cooling condition may be that the number of sheets to which an image is formed by the image forming apparatus 1 and that are conveyed to the image sensors 30a and 30b via the flapper 53 exceeds a threshold number of sheets. The counter 209 increments a count value by 1 each time the sheet sensor 241 detects a sheet passing the discharge path 27 or the flapper 53. The condition determination unit 210 determines that the cooling condition is satisfied when the count value exceeds the threshold number of sheets and determines that the cooling condition is not satisfied when the count value does not exceed the threshold number of sheets. The number of sheets may be the number of times a sheet passes through the fixing unit 19, the discharge path 27, or the flapper 53. The threshold number of sheets is a number of sheets necessary for causing the cooling mechanism to activate or enhancing the cooling effect, and is determined by testing or simulation in advance. Note, the setting unit 211 may cause the cooling effect of the cooling mechanism to increase in accordance with the number of sheets counted by the counter 209.

Cooling Condition Based on the Type of Sheet

The cooling condition may be determined based on the type of sheet. Between thin paper and thick paper, thin paper heats up more easily. The acceptance unit 203 accepts type information indicating whether the type of sheet is thin paper or thick paper in advance. The condition determination unit 210 may have a paper type determination unit that determines whether or not the sheet is a predetermined type (example: thin paper) based on the type information accepted by the acceptance unit 203. The condition determination unit 210 determines that the cooling condition is satisfied when the sheet is a predetermined type and determines that the cooling condition is not satisfied when the sheet is not the predetermined type. Note, the type of sheet may be a type according to an existence or absence of a surface coat or a material (synthetic resin/paper). The type information may be selected by an operator from a plurality of choices displayed on the operation unit 201 and may be directly inputted as brand information. In any case, it is assumed that specific types for which an activation of the cooling mechanism or an increase in the cooling effect is necessary are determined in advance and that are stored in a storage apparatus that the control unit 200 has. Note, the thickness of a sheet may be detected by an ultrasonic sensor or an optical sensor that detects thickness. These sensors are generally called media sensors.

Cooling Condition Based on the Temperature of the Image Forming Apparatus 1

The cooling condition may be that the temperature of the image forming apparatus 1 (fixing unit 19) exceeds a threshold temperature. The temperature of the fixing unit 19 can be detected by the thermistor 272. Also, the temperature of the recording material S correlates to the temperature of the fixing unit 19. Accordingly, the temperature of the fixing unit 19 is an indication as to whether or not the recording material S is in a high temperature state. The condition determination unit 210 determines that the cooling condition is satisfied when the temperature of the fixing unit 19 detected by the thermistor 272 exceeds the threshold temperature and determines that the cooling condition is not satisfied when the temperature of the fixing unit 19 does not exceed the threshold temperature.

Cooling Condition Based on the Target Fixing Temperature of the Fixing Unit

The control unit 200 sets a target fixing temperature of the fixing unit in accordance with the type of sheet or the image forming mode accepted by the acceptance unit 203. The fixing control unit 207 controls the temperature of the heater 271 in accordance with the target fixing temperature. Accordingly, the cooling condition may be that the target fixing temperature exceeds the threshold temperature. The temperature of the fixing unit 19 correlates to the target fixing temperature and the temperature of the sheet correlates to the temperature of the fixing unit 19. In other words, the temperature of the sheet correlates to the target fixing temperature. The condition determination unit 210 determines that the cooling condition is satisfied if the set target fixing temperature exceeds a threshold temperature and determines that the cooling condition is not satisfied if the target fixing temperature does not exceed the threshold temperature.

Cooling Condition Based on the Temperature of Sheet

Figure 5A:
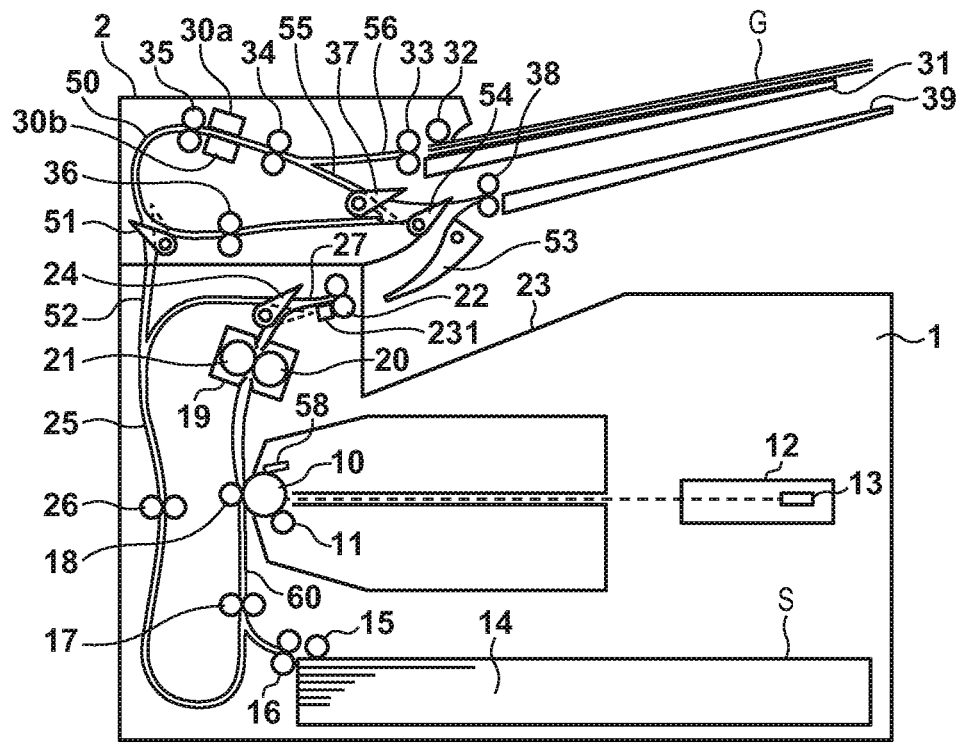
FIGS. 5A and 5B are views illustrating examples of conveying a sheet.

A thermistor 231 may be a temperature detection element that detects the temperature of the recording material S or the original G. Although the thermistor 231 is arranged in the discharge path 27 as FIG. 5A illustrates, it may be arranged on the flapper 53 which guides and conveys the recording material S. The thermistor 231 detects the temperature of a sheet at a position in which the recording material S, to which heat was added by the fixing unit 19, passes. Accordingly, the cooling condition may be that the sheet temperature exceeds the threshold temperature. The condition determination unit 210 determines that the cooling condition is satisfied if the sheet temperature exceeds a threshold temperature and determines that the cooling condition is not satisfied if the sheet temperature does not exceed the threshold temperature. Note, the position of the thermistor 231 may be upstream of the image sensors 30a and 30b in the sheet conveyance direction.

Cooling Condition Based on the Temperature of Image Sensor

Figure 5B:
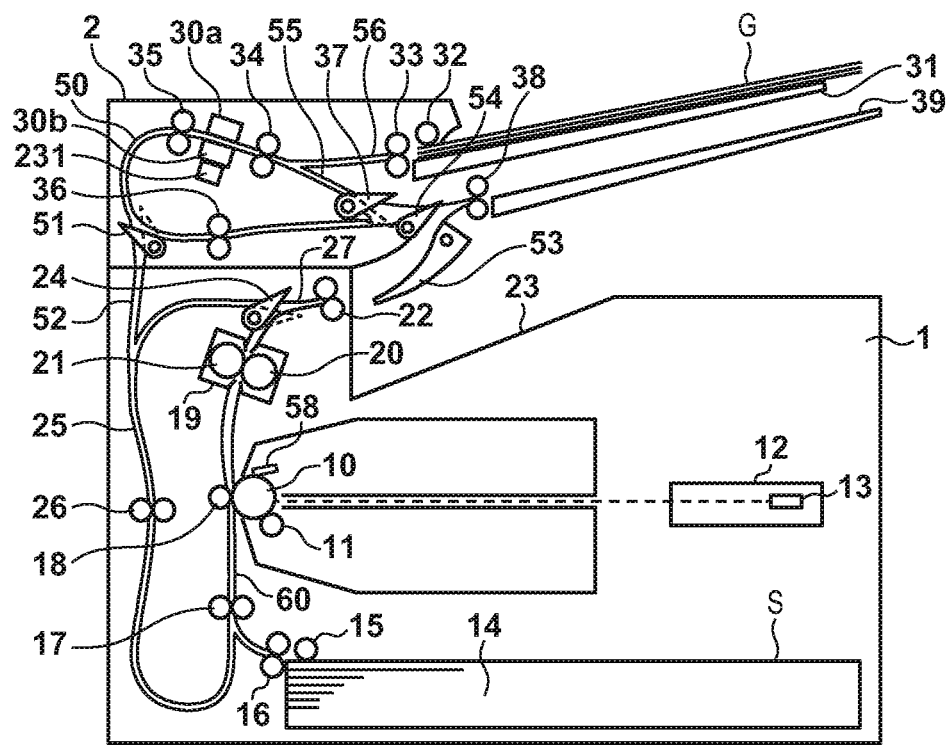

The thermistor 231 may be a temperature detection element that detects the temperature of the image sensors 30a and 30b. The thermistor 231 may be directly fixed to the image sensors 30a and 30b or may be arranged in the vicinity of the image sensors 30a and 30b as FIG. 5B illustrates. A rise in temperature of the image sensors 30a and 30b themselves is the main cause for a decrease of the read accuracy of the image sensors 30a and 30b. Accordingly, a method of detecting the temperature of the image sensors 30*a* and 30*b* may be the most rudimentary method. In such a case, the cooling condition may be that the temperature of the image sensors 30*a* and 30*b* exceeds a threshold temperature. The condition determination unit 210 determines that the cooling condition is satisfied when the temperature of the image sensors 30*a* and 30*b* exceeds the threshold temperature and determines that the cooling condition is not satisfied when the temperature of the image sensors 30*a* and 30*b* does not exceed the threshold temperature.

Cooling Mechanism

In the present embodiment, three examples hereinafter are introduced as cooling mechanisms (temperature rise suppression mechanism) that cool the recording material S or the image sensors 30*a* and 30*b*.

Ensuring Cooling Time by a Decrease of Conveyance Speed

The temperature of the environment in which the image forming system 100 is installed is low compared to the fixing temperature. Accordingly, the temperature of the recording material S that passes through the fixing unit 19 gradually decreases and approaches the temperature of the environment (environmental temperature) in which the image forming system 100 is set. A predetermined cooling time is necessary for the temperature of the recording material S to sufficiently decrease. Accordingly, the conveyance control unit 206 sets a conveyance speed V of the recording material S discharged from the image forming apparatus 1 to a first conveyance speed V1 which is slower than a second conveyance speed V2 of the original G. By this, a conveying time required when conveying the recording material S at the first conveyance speed V1 is longer than a conveying time required when conveying the recording material S at the second conveyance speed V2. In other words, a cooling time is ensured by causing the conveyance speed to decrease.

Figure 6A:
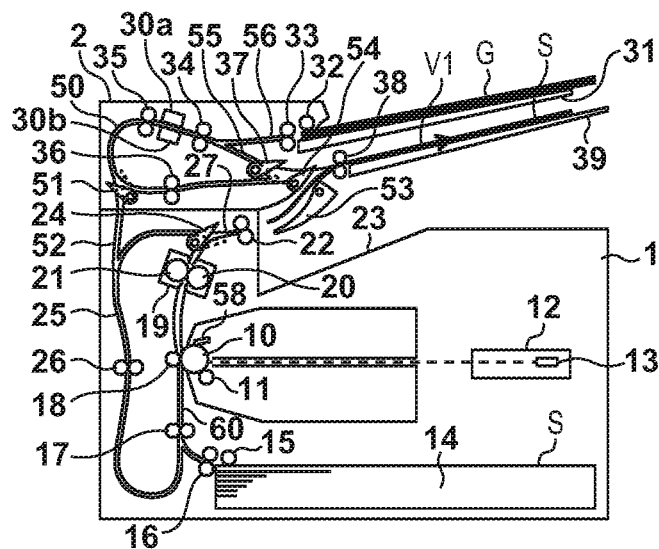
FIGS. 6A to 6C are views illustrating examples of conveying a sheet.
Figure 6B:
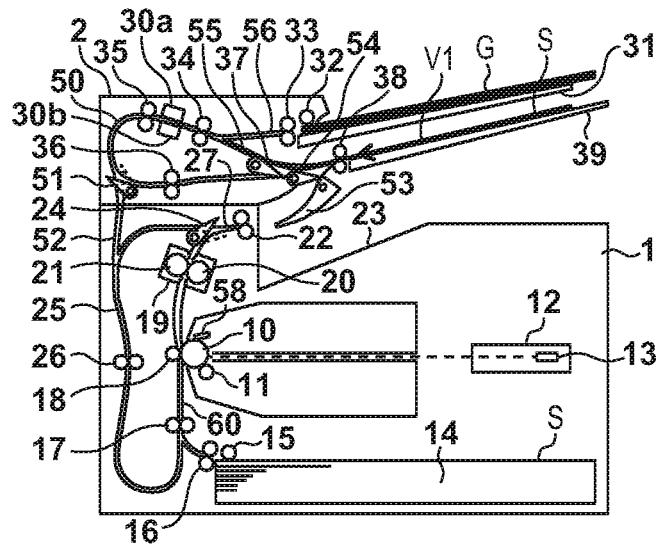

When the cooling condition is satisfied, the conveyance control unit 206 switches the conveyance speed of the recording material S by the discharging rollers 38 of the image reading apparatus 2 from V2 to V1 as FIG. 6A illustrates. This switch timing is a timing at which the trailing edge of the recording material S passes the discharging rollers 22 for example. By this, configuration is taken such that the recording material S does not warp in the guiding conveyance path. When the trailing edge of the recording material S passes the flapper 54, the conveyance control unit 206 switches the discharging rollers 38 from a forward rotation to a reverse rotation. The conveyance speeds of the discharging rollers 38, the conveyance rollers 34, the conveyance rollers 35, and the conveyance rollers 36 are all set to V1. In other words, the conveyance speed is a parameter for influencing the cooling effect, and is set in the conveyance control unit 206 by the setting unit 211 in accordance with the determination result of the condition determination unit 210. The recording material S is sent to the second sub conveyance path 55 as FIG. 6B illustrates. The recording material S is conveyed to the second main conveyance path 50 and is fed to the image sensors 30*a* and 30*b*. The image sensors 30*a* and 30*b* operate by an image clock in accordance with the conveyance speed and read the first side and the second side of the recording material S respectively.

Figure 6C:
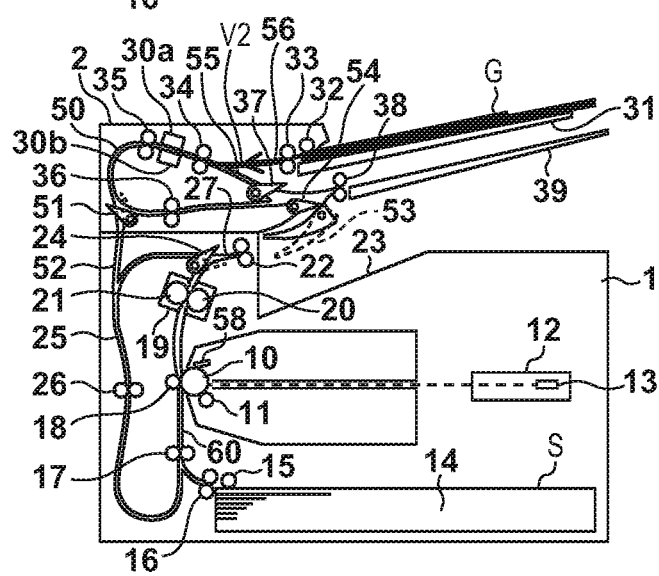

Note, a sheet fed through the image sensors 30*a* and 30*b* is the original G or the like, and there are cases when the condition determination unit 210 is determined when the cooling condition is not satisfied. In such a case, the setting unit 211 sets the conveyance speed to V2 for which the cooling effect is low. The conveyance control unit 206 causes the conveyance rollers 34, 35, and 36 and the discharging rollers 38 to rotate at the second conveyance speed V2 as FIG. 6C illustrates.

Here, the first conveyance speed V1 of a high cooling effect is determined such that the temperature of the recording material S has sufficiently decreased until the recording material S reaches the image sensors 30*a* and 30*b*. Also, the second conveyance speed V2 of a low cooling effect may be set to a maximum conveyance speed for which an image can be read by the image sensors 30*a* and 30*b*. In this way, it is possible to sufficiently cool the recording material S by causing the conveyance speed of the recording material S to decrease, and a temperature rise of the image sensors 30*a* and 30*b* is suppressed and the read accuracy is maintained.

Ensuring Cooling Time by Temporary Conveyance Stoppage

Figure 7A:
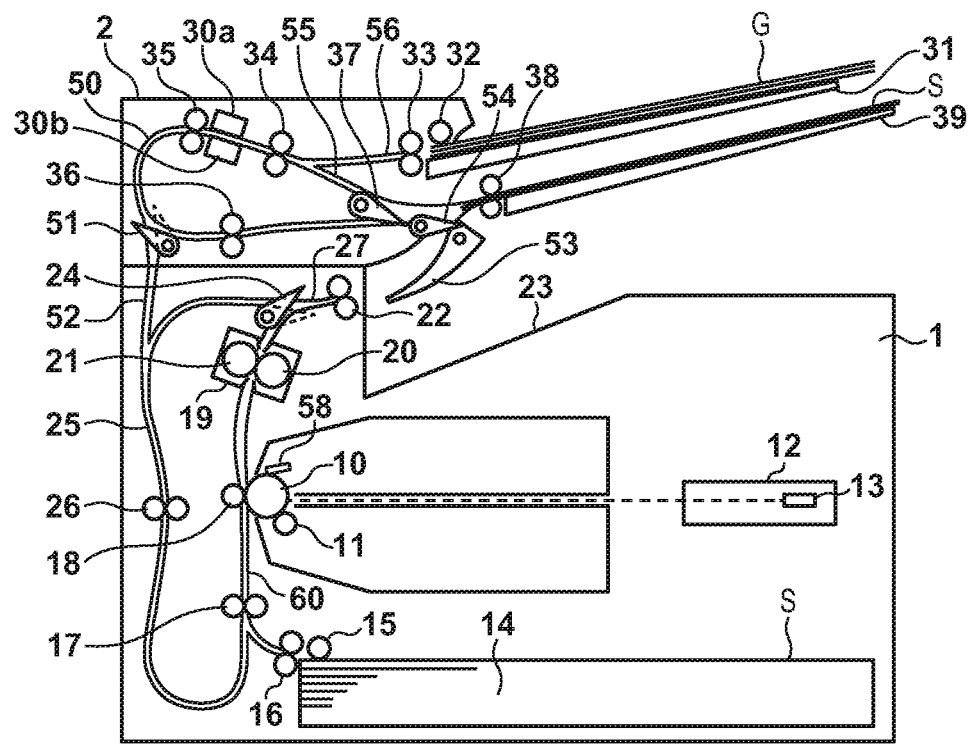
FIGS. 7A and 7B are views illustrating examples of conveying a sheet.

In the above described embodiment, the cooling time is ensured by causing the conveyance speed of the recording material S to decrease. Here, the conveyance speed may be temporarily set to zero. For example, the conveyance control unit 206 may cause the recording material S to wait through a predetermined cooling time in the second discharge unit 39 as illustrated in FIG. 7A.

When the cooling condition is satisfied, the conveyance control unit 206 switches the conveyance speed of the recording material S by the discharging rollers 38 of the image reading apparatus 2 from V2 to zero. This switch timing is a timing at which the trailing edge of the recording material S passes the flapper 37 for example. By this, the recording material S waits in the second discharge unit 39 in a state in which the trailing edge is pinched in the discharging rollers 38 because the discharging rollers 38 stop. The conveyance control unit 206 uses a timer, a counter, or the like to measure the wait time. When the measured wait time becomes a predetermined wait time T1, the conveyance control unit 206 starts a reverse rotation of the discharging rollers 38 and conveys the recording material S at the second conveyance speed V2 set by the setting unit 211. However, the wait time T1 is set to a time in which the recording material S can be sufficiently cooled. The recording material S is fed to the image sensors 30*a* and 30*b* via the second sub conveyance path 55 and the second main conveyance path 50. The image sensors 30*a* and 30*b* operate by an image clock in accordance with the second conveyance speed V2 and read the first side and the second side of the recording material S respectively.

In this way, it is possible to sufficiently cool the recording material S by temporarily causing the recording material S to wait, and a temperature rise of the image sensors 30*a* and 30*b* is suppressed and the read accuracy is maintained. A wait location of the recording material S may be a position upstream of the image sensors 30*a* and 30*b* in the conveyance direction. Also, the conveyance control unit 206 may supply sheets to the image sensors 30*a* and 30*b* without causing them to wait if the cooling condition is not satisfied.

Also, there are cases when it is necessary to cause a temporary wait in the second discharge unit 39 of both a high temperature state recording material S that has passed through the image forming apparatus 1 and the original G that has not passed through the image forming apparatus 1. In such a case, the setting unit 211 sets the wait time of the recording material S to be longer than the wait time of the original G. In other words, the difference between the wait time of the recording material S and the wait time of the original G is the cooling time.

Cooling Fan

Figure 7B:
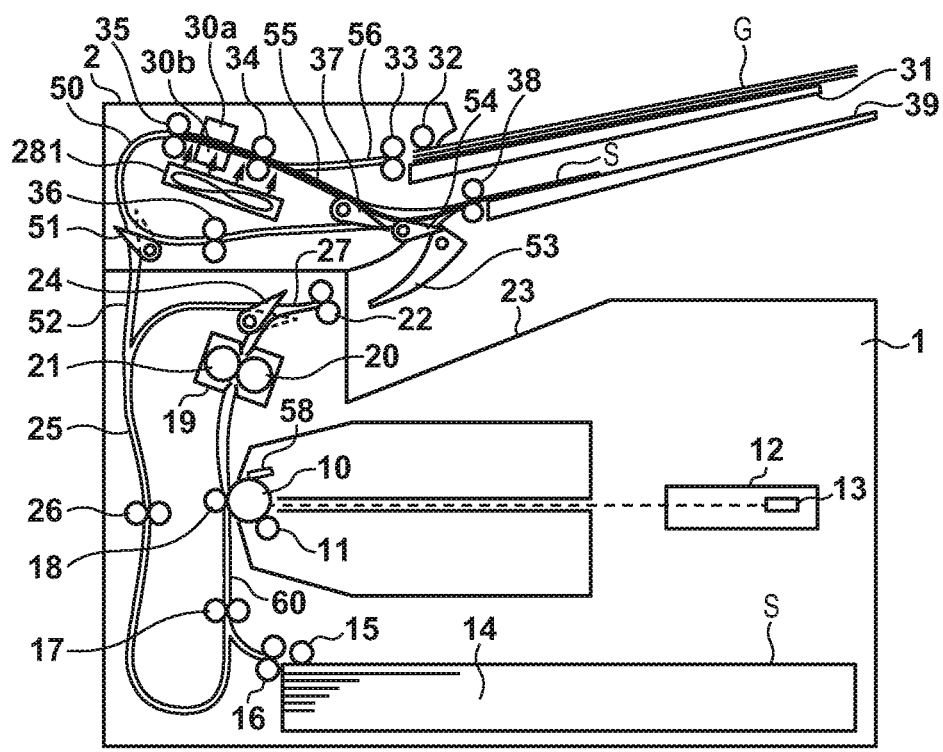

The cooling fan 281 that cools the recording material S or the image sensors 30a and 30b may be arranged as illustrated in FIG. 7B. By virtue of FIG. 7B, the cooling fan 281 is fixed to the bottom of or below the image sensors 30a and 30b. Another cooling element such as a Peltier element may be employed in place of the cooling fan 281. An opening for ventilation may be arranged on the floor surface of the second main conveyance path 50 opposite the blowing surface of the cooling fan 281. By this, an air duct is formed from the cooling fan 281 to the sheet and a sheet can be cooled in addition to the image sensors 30a and 30b. The cooling fan 281 may be arranged on a side surface of the image sensors 30a and 30b. In any case, the cooling fan 281 can be installed if positioned (a position within the image reading apparatus 2) so as to be able to form an air duct through which the image sensors 30a and 30b and a sheet can be cooled.

When the condition determination unit 210 determines that the cooling condition is satisfied, the fan control unit 208 causes the cooling fan 281 to operate and cools the image sensors 30a and 30b and the recording material S conveyed through the second main conveyance path 50. By this, a temperature rise of the image sensors 30a and 30b is suppressed and read accuracy is maintained. Meanwhile, when the condition determination unit 210 determines that the cooling condition is not satisfied, the fan control unit 208 causes the cooling fan 281 to stop. By this, it is possible to cause a decrease in operating sound and consumption of power by the cooling fan 281.

Note, configuration may be such that the cooling fan 281 is not stopped completely when the cooling condition is not satisfied. The setting unit 211 may set the cooling effect of the cooling fan 281 to P1 when the cooling condition is satisfied and may set the cooling effect of the cooling fan 281 to P2 when the cooling condition is not satisfied. Here P1>P2. The fan control unit 208 drives the cooling fan 281 in accordance with the set cooling effect. Note, P1 and P2 may be a number of rotations of the cooling fan. By setting the cooling effect to P1, a temperature rise of the image sensors 30a and 30b is suppressed and read accuracy is maintained. Also, operating sound and power consumption of the cooling fan 281 can be suppressed by setting the cooling effect to P2.

Flowchart

Figure 8:
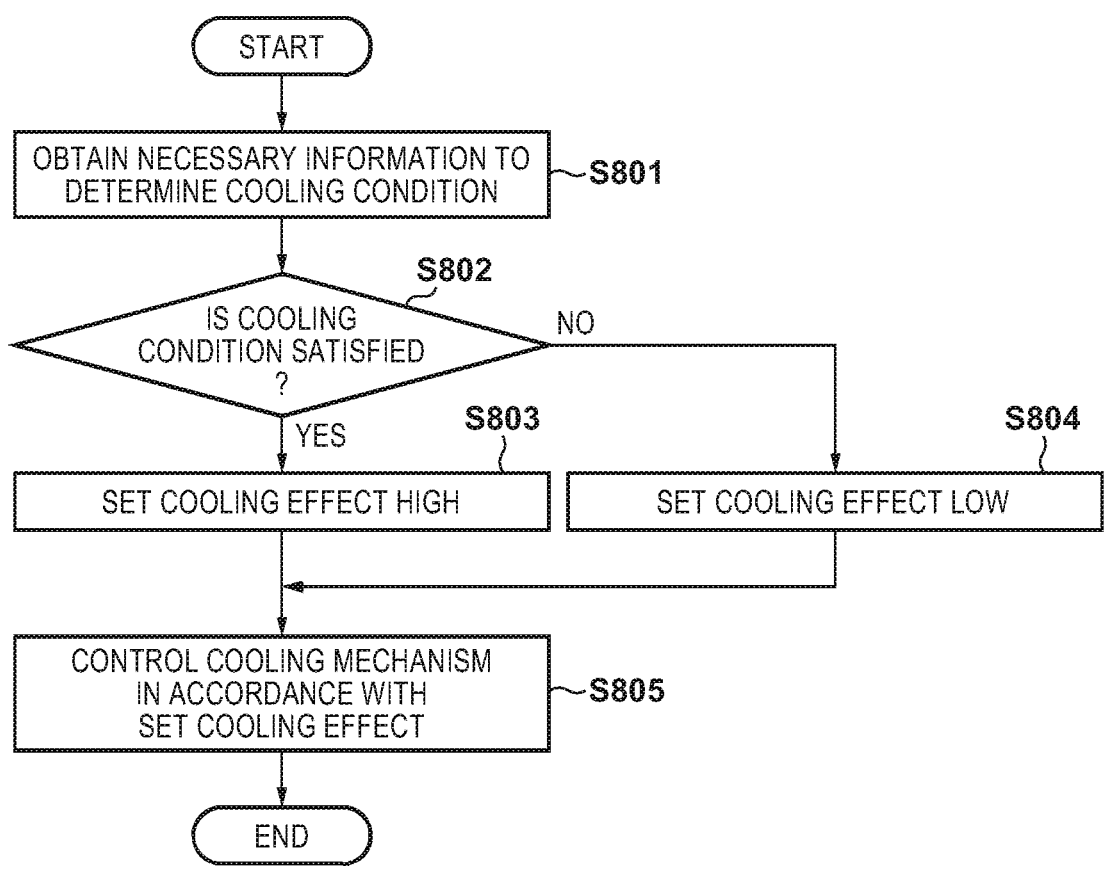
FIG. 8 is a flowchart illustrating cooling control.

FIG. 8 is a flowchart illustrating cooling control.

In step S801, the control unit 200 obtains information that is necessary for determining a cooling condition. For example, information relating to the result of detecting a sheet by the sheet sensor 241, the result of detecting a temperature of the thermistors 231 and 272, a control mode accepted by the acceptance unit 203, a type of recording material S, a target fixing temperature, or the like is obtained.

In step S802, the control unit 200 determines whether or not a cooling condition based on the information obtained is satisfied. For example, the condition determination unit 210 of the control unit 200 determines whether or not the recording material S on which an image is formed is conveyed to the image reading apparatus 2 based on the detection result of the sheet sensor 241. Alternatively, the condition determination unit 210 determines whether or not a temperature detected by the thermistors 231 and 272 exceeds the threshold temperature. The detected temperature may be any of the temperature of the recording material S, the temperature of the fixing unit 19, or the temperature of the image sensors 30a and 30b. Also, the condition determination unit 210 may determine whether or not the control mode accepted by the acceptance unit 203 is a predetermined control mode. The condition determination unit 210 may determine whether or not the type of the recording material S is a predetermined type.

The control unit 200 advances to step S803 and sets the cooling effect higher if the cooling condition is satisfied. The control unit 200 sets the conveyance speed to a low speed, sets the wait time to be long, and sets the air flow of the cooling fan 281 to be large. The control unit 200 advances to step S804 and sets the cooling effect to low if the cooling condition is not satisfied. The control unit 200 sets the conveyance speed to a high speed, sets the wait time to be short, and sets the air flow of the cooling fan 281 to be small.

In step S805, the control unit 200 controls the cooling mechanism in accordance with the cooling effect set in step S803 or step S804. For example, the control unit 200 conveys the recording material S at the first conveyance speed V1, stops the conveyance of the recording material S through the wait time T1, or drives the cooling fan 281 such that the air flow becomes P1. By this, the image forming system 100 which is capable of reading with good accuracy by the image reading apparatus 2 a sheet on which an image is formed by the image forming apparatus 1 is provided.

Other

As described above, there are cases when an image is formed on both sides of the recording material S and both sides are read by the image reading apparatus 2. Also, there are cases when the image reading apparatus 2 is equipped with the image sensor 30b for reading the bottom surface side of a sheet and not equipped with the image sensor 30a for reading the top surface side. In these cases, an image is formed on the first side of the recording material S fed from the first feeding unit 14, it is conveyed to the image reading apparatus 2 via the flapper 53, and the first side is read by the image sensor 30b. The recording material S returns to the image forming apparatus 1 via the contact path 52 and an image is formed on the second side. The recording material S is conveyed to the image reading apparatus 2 via the flapper 53 and the second side is read by the image sensor 30b. Then, the recording material S is discharged to the second discharge unit 39. In this way, a both side image formation process and a both side reading are a single process including these steps. For example, an image is formed on the first side, and when the cooling condition is satisfied prior to the image being read, the cooling mechanism is activated until the process completes. In this way, a period in which the cooling mechanism is activated is from when the cooling condition is satisfied until when a sheet is discharged and stacked on the second discharge unit 39. In other words, there are cases when one sheet passes through the image forming apparatus 1 and the image reading apparatus 2 a plurality of times by going through various steps. In such a case, a temperature rise suppression of the image sensors 30a and 30b by the cooling mechanism is continued until one process for a sheet ends.

<Summary>

As described above, by virtue of this embodiment, the image forming system 100, which has the image forming apparatus 1 that forms an image on a sheet such as the recording material S or the original G and the image reading apparatus 2 that reads a sheet such as the recording material S or the original G, is provided. The photosensitive drum 10, the fixing unit 19, or the like are an example of an image forming unit that is arranged in the image forming apparatus 1 and forms an image on a sheet by adding heat. The discharging rollers 22 are one example of a discharge unit that discharges a sheet on which an image is formed. The first discharge unit 23 is one example of a stacking unit that stacks and holds a sheet discharged by the discharging rollers 22. The flapper 53 is one example of a guiding conveyance path that intercepts a sheet discharged from the discharging rollers 22 and guides it to the image reading apparatus 2. Also, the flapper 53 is one example of a switching unit that switches between stacking a sheet discharged from the discharge unit on the stacking unit or conveying it toward the image reading apparatus. The paper feed roller 32 is arranged in the image reading apparatus 2 and is one example of a feeding unit that feeds a sheet such as the original G. The second main conveyance path 50 is one example of a main conveyance path for conveying a sheet fed by the paper feed roller 32. The image sensors 30a and 30b are one example of a reading unit that reads an image formed on a sheet such as the original G or the recording material S conveyed through the second main conveyance path 50. The discharging rollers 38 are one example of a conveyance unit that conveys a sheet conveyed via the flapper 53 to the image sensors 30a and 30b. The conveyance control unit 206 is one example of a cooling unit or a temperature rise suppression unit that causes the conveyance speed to decrease or causes conveyance of a sheet such as the recording material S to temporarily stop. Also, the cooling fan 281 is one example of a cooling unit or a temperature rise suppression unit that cools the image sensors 30a and 30b or the recording material S on which an image is formed. These cooling mechanisms cool a sheet discharged from the discharging rollers 22 of the image forming apparatus 1 and conveyed to the image sensors 30a and 30b. Also, the cooling mechanism cools the image sensors 30a and 30b themselves. In this way, by virtue of this embodiment, the image forming system 100, which is capable of reading with good accuracy by the image reading apparatus 2 a sheet on which an image is formed by the image forming apparatus 1 because a temperature rise of the image sensors 30a and 30b is suppressed, is provided.

The conveyance control unit 206 may function as a cooling unit that cools a sheet as described using FIG. 6A through FIG. 6C. The conveyance control unit 206 may have a speed control unit that causes the conveyance speed of a sheet by the discharging rollers 38 or the like to decrease to the first conveyance speed V1 slower than the second conveyance speed V2 which is the conveyance speed of the original G fed from the paper feed roller 32. In this way, it is possible to decrease the temperature of the recording material S and suppress a rise of the temperature of the image sensors 30a and 30b because the cooling time is increased by causing the conveyance speed to decrease.

The conveyance control unit 206 is one example of a conveyance control unit that causes conveyance of a sheet by the discharging rollers 38 to stop through a predetermined cooling time (example: wait time T1) and that causes the sheet to be conveyed to the image sensors 30a and 30b by the discharging rollers 38. By stopping the conveyance of the sheet through the cooling time, the heat of a sheet radiates into the atmosphere and the temperature of the sheet decreases more easily. In other words, a temperature rise of the image sensors 30a and 30b is suppressed.

The cooling fan 281 is one example of a cooling unit that cools a sheet or the image sensors 30a and 30b as described using FIG. 4 and FIG. 7B. By this, a temperature rise of the image sensors 30a and 30b can be suppressed without a decrease of the conveyance speed or a cooling time being employed. In other words, usability may be improved because a waiting time of the operator can be shortened.

Note, a speed decrease or a cooling time may be combined with the cooling fan 281. A difference between the first conveyance speed V1 and the conveyance speed V2 becomes lower and the cooling time may be shortened by introducing the cooling fan 281.

The condition determination unit 210 is one example of a determination unit that determines whether or not a predetermined cooling condition is satisfied as described using FIG. 4 and the like. The setting unit 211 is an example of a setting unit that sets a cooling effect of a cooling mechanism higher when the predetermined cooling condition is satisfied and sets the cooling effect of the cooling mechanism lower when the predetermined cooling condition is not satisfied. As described above, it is possible to employ various conditions as a cooling condition.

The sheet sensor 241 is one example of a detection unit that detects a sheet that passed through the fixing unit 19. In such a case, the predetermined cooling condition may be that a sheet on which an image is formed by the fixing unit 19 is conveyed to the image sensors 30a and 30b. The condition determination unit 210 may determine whether or not the predetermined cooling condition is satisfied in accordance with whether or not the sheet sensor 241 detected a sheet. Note, cooling by the cooling mechanism may be executed from a first sheet or may be executed from a predetermined number of sheets. For example, the counter 209 functions as a count unit that counts the number sheets detected by the sheet sensor 241. In such a case, the predetermined cooling condition may be that the number of sheets to which an image is formed by the fixing unit 19 and that are conveyed to the image sensors 30a and 30b via the guiding conveyance path exceeds a threshold number of sheets. The condition determination unit 210 may determine whether or not the predetermined cooling condition is satisfied in accordance with whether or not the number of sheets counted by the counter 209 exceeds a threshold number of sheets. There are cases when a temperature rise of the image sensors 30a and 30b leading to a decrease of read accuracy does not occur when only one sheet is conveyed. This is because there is a dependency on the temperature tolerance of the sensor. Accordingly, the threshold number of sheets may be determined depending on the temperature tolerance of the employed the image sensors 30a and 30b. In particular, the waiting time of a user concerning a plurality of sheets in regards to the cooling mechanism that causes the conveyance speed to decrease or that causes the conveyance to stop may be reduced.

The thermistor 231 is one example of a detection unit (temperature sensor) that detects the temperature of a sheet on which an image is formed by the fixing unit 19, and that is conveyed to the image sensors 30a and 30b via the guiding conveyance path as described using FIG. 4, FIG. 5A, and the like. In such a case, the predetermined cooling condition may be that the temperature of a sheet to which an image is formed by the fixing unit 19 and that is conveyed to the image sensors 30a and 30b via the guiding conveyance path exceeds a threshold temperature. The condition determination unit 210 may determine whether or not the predetermined cooling condition is satisfied in accordance with whether or not the temperature of a sheet detected by the thermistor 231 exceeds a threshold temperature. In this way, a temperature rise of the image sensors 30a and 30b may be suppressed by directly detecting the temperature of a sheet.

The thermistor 272 is one example of a detection unit (temperature sensor) that detects the temperature of the image forming unit as described using FIG. 4 and the like.

In such a case, a predetermined cooling condition may be that the temperature of the image forming unit exceeds a threshold temperature. The condition determination unit 210 may determine whether or not the predetermined cooling condition is satisfied in accordance with whether or not the temperature of an image forming unit such as the fixing unit 19 detected the thermistor 272 exceeds a threshold temperature. The temperature of the fixing unit 19 may be employed as an indication of the temperature of a sheet because the temperature of the fixing unit 19 correlates to the temperature of the sheet. In this way, a temperature rise of the image sensors 30a and 30b may be suppressed by indirectly obtaining the temperature of a sheet. Note, the temperature of the fixing unit 19 is controlled at a target fixing temperature set by the fixing control unit 207. Accordingly, the predetermined cooling condition may be that the target fixing temperature of the fixing unit 19 exceeds the threshold temperature. The condition determination unit 210 may determine whether or not the predetermined cooling condition is satisfied in accordance with whether or not the target fixing temperature of the fixing unit 19 exceeds a threshold temperature. In this way, a temperature rise of the image sensors 30a and 30b may be suppressed by indirectly obtaining the temperature of a sheet.

The thermistor 231 is one example of a detection unit that detects the temperature of the image sensors 30a and 30b as described using FIG. 5B and the like. In such a case, the predetermined cooling condition may be that the temperature of the image sensors 30a and 30b exceeds a threshold temperature. The condition determination unit 210 may determine whether or not the predetermined cooling condition is satisfied in accordance with whether or not the temperature of the image sensors 30a and 30b detected by the thermistor 231 exceeds a threshold temperature. In this way, the temperature of a reading unit such as the image sensors 30a and 30b is directly measured and a temperature rise of the image sensors 30a and 30b may be suppressed.

The condition determination unit 210 or a media sensor (example: an optical sensor or an ultrasonic sensor) may function as a determination unit that determines a type of sheet. In such a case, a predetermined cooling condition may be that the type of sheet is a predetermined type. The condition determination unit 210 may determine whether or not the predetermined cooling condition is satisfied in accordance with whether or not the determined type of the sheet is a predetermined type. How easily the temperature of the sheet rises and how easily the sheet retains heat depend on the type of sheet. In other words, an amount of heat radiated to the image sensors 30a and 30b depends of the type of sheet (example: thickness, material, and the like). Accordingly, the cooling mechanism may be controlled in accordance with the type of sheet designated from the operation unit 201 or a host computer or the type of sheet obtained by the media sensor. A type of sheet that can easily cause a temperature rise in the image sensors 30a and 30b can be known in advance. The cooling effect of the cooling mechanism may be enhanced when such specific sheets are used.

The acceptance unit 203 is one example of an acceptance unit that accepts a setting of a control mode of the image forming system 100. In such a case, a predetermined cooling condition may be that the control mode of the image forming system 100 that is designated is a control mode in which a sheet on which an image is formed by the fixing unit 19 or the like is read by the image sensors 30a and 30b. The condition determination unit 210 may determine whether or not the predetermined cooling condition is satisfied in accordance with whether or not the control mode set through the acceptance unit 203 is a control mode in which a sheet on which an image is formed by the fixing unit 19 or the like is read by the image sensors 30a and 30b. A state in which activation of the cooling mechanism is necessary can be determined even if the temperature of such a sheet cannot be directly measured.

The guiding conveyance path may include a guiding member that switches between a position in which it guides a sheet discharged from the discharging rollers 22 to the image reading apparatus 2 and a position in which it guides the sheet discharged from the discharging rollers 22 to the first discharge unit 23. In other words, the guiding conveyance path may be realized by the flapper 53. Also, the discharging rollers 38 are arranged at an outlet of the second main conveyance path 50 and may be rotating bodies that have a forward rotation mode for rotating forward so that a sheet is discharged from the image reading apparatus 2 and a reverse rotation mode for causing the conveyance direction of a sheet to reverse to convey the sheet to the image sensors 30a and 30b.

Note, the image forming apparatus 1 may have the following features as described using FIG. 1. The first main conveyance path 60 is a conveyance path for conveying the recording material S from a storage unit (the first feeding unit 14) to a discharge unit (the first discharge unit 23). The photosensitive drum 10, the fixing unit 19, and the like are arranged in the first main conveyance path 60 and are an example of an image forming unit that forms an image on the recording material S. The discharging rollers 22 function as a first reversing unit that reverses a surface opposing the image forming unit by reversing the conveyance direction of the recording material S conveyed through the first main conveyance path 60. The first sub conveyance path 25 is one example of a conveyance path for conveying the recording material S whose conveyance direction is reversed by the first reversing unit to the first main conveyance path 60. The first sub conveyance path 25 may be called a double-sided conveyance path. Note, the image reading apparatus 2 may have the following features as described using FIG. 1. The second main conveyance path 50 is a conveyance path for conveying the original G fed from the second feed unit 31. The image sensors 30a and 30b are arranged in the second main conveyance path 50 and function as reading units that read the original G. The discharging rollers 38 function as a second reversing unit that reverses the conveyance direction of the original G. The second sub conveyance path 55 functions as a conveyance path for conveying the original G whose conveyance direction is reversed by the second reversing unit to the second main conveyance path 50. The image forming system 100 may additionally have the following features. The flapper 53 and the like function as a guiding conveyance path for conveying the recording material S on which an image is formed by the image forming unit to the second reversing unit of the image reading apparatus 2. The conveyance control unit 206, the cooling fan 281 and the like function as a cooling unit that cools an image formed by the image forming unit and the recording material S conveyed to the image reading apparatus 2 via the guiding conveyance path or that cools the reading unit. The reading unit reads, as the original G, the recording material S on which an image is formed by the image forming unit and that is conveyed to the image reading apparatus 2 via the guiding conveyance path.

An image forming system having the image forming apparatus 1 and the image reading apparatus 2 is described in the foregoing embodiment, but the image forming apparatus 1 which has an image reading function is one type of image forming system. Note, the image sensors 30a and 30b may be arranged on a conveyance path (the first sub conveyance path 25 or the first main conveyance path 60) that the image forming apparatus 1 is equipped with. A switching unit such as the flapper 24 or the flapper 53 are arranged in the middle of the conveyance path. These switch between conveying a sheet on which an image is formed to the first discharge unit 23 or conveying it to the image sensors 30a and 30b. The conveyance control unit 206 functions as a cooling unit or a temperature rise suppression unit that causes the conveyance speed of a sheet to decrease and that causes conveyance of a sheet to temporarily stop. Also, the cooling fan 281 functions as a cooling unit or a temperature rise suppression unit that cools a sheet on which an image is formed or the image sensors 30a and 30b. In this way, by virtue of this embodiment, the image forming apparatus 1, which is capable of reading with good accuracy a sheet on which an image is formed by the image sensors 30a and 30b because a temperature rise of the image sensors 30a and 30b is suppressed, is provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-085427, filed Apr. 21, 2016, which is hereby incorporated by reference herein in its entirety.

What is claimed is:

1. An image forming system including an image forming apparatus that forms an image on a first sheet and an image reading apparatus that reads the image formed on the first sheet, the system comprising:

an image forming unit arranged in the image forming apparatus and configured to form the image on the first sheet;

a discharge unit configured to discharge the first sheet on which the image is formed by the image forming unit;

a stacking unit configured to stack the first sheet discharged by the discharge unit;

a switching unit configured to switch between stacking the first sheet discharged from the discharge unit on the stacking unit or conveying the first sheet discharged from the discharge unit toward the image reading apparatus;

a feeding unit arranged in the image reading apparatus and configured to feed a second sheet;

a main conveyance path configured to convey the second sheet fed by the feeding unit;

a reading unit configured to read the image formed on the first sheet and the image formed on the second sheet conveyed through the main conveyance path;

a conveyance unit configured to convey the first sheet conveyed via the switching unit to the reading unit such that the reading unit reads the image formed on the first sheet by the image forming unit; and a control unit configured to control cooling of the first sheet discharged from the discharge unit of the image forming apparatus and conveyed to the reading unit, wherein the control unit includes a conveyance control unit configured to cause a conveyance of the first sheet by the conveyance unit to stop through a predetermined cooling time and then to cause the first sheet to be conveyed to the reading unit by the conveyance unit.

2. The image forming system according to claim 1, wherein the switching unit includes a guiding member that switches between a position in which the guiding member guides the first sheet discharged from the discharge unit to the image reading apparatus and a position in which the guiding member guides the first sheet discharged from the discharge unit to the stacking unit.

3. The image forming system according to claim 1, wherein the conveyance unit is arranged at an outlet of the main conveyance path and is a rotating body having a forward rotation mode for rotating forward so that the first sheet is discharged from the image reading apparatus and a reverse rotation mode for causing the conveyance direction of the first sheet to reverse to convey the first sheet to the reading unit.

4. An image forming system including an image forming apparatus that forms an image on a first sheet and an image reading apparatus that reads the image formed on the first sheet, wherein the image forming apparatus comprises:

a first main conveyance path configured to convey the first sheet from a storage unit to a discharge unit;

an image forming unit that is arranged in the first main conveyance path and that is configured to form the image on the first sheet;

a first reversing unit configured to reverse a surface of the first sheet that opposes the image forming unit by reversing a conveyance direction of the first sheet conveyed through the first main conveyance path; and a first sub conveyance path configured to convey the first sheet whose conveyance direction is reversed by the first reversing unit to the first main conveyance path, the image reading apparatus comprises:
- a second main conveyance path configured to convey a second sheet fed from a feed unit;
- a reading unit that is arranged in the second main conveyance path and that is configured to read an image formed on the second sheet;
- a second reversing unit configured to reverse the conveyance direction of the second sheet; and
- a second sub conveyance path configured to convey the second sheet whose conveyance direction is reversed by the second reversing unit to the second main conveyance path, the image forming system further comprises:
- a guiding conveyance path configured to convey the first sheet on which the image is formed by the image forming unit to the second reversing unit of the image reading apparatus; and
- a control unit configured to control cooling of the first sheet, on which the image has been formed by the image forming unit and which is conveyed to the image reading apparatus via the guiding conveyance path, the reading unit further reads the image formed by the image forming unit on the first sheet that is conveyed to the image reading apparatus via the guiding conveyance path, and the control unit includes a conveyance control unit configured to cause a conveyance of the first sheet to stop through a predetermined cooling time and then to cause the first sheet to be conveyed to the reading unit.

5. An image forming apparatus comprising:
- a feeding unit configured to feed a first sheet;
- a main conveyance path configured to convey the first sheet fed by the feeding unit;
- a reading unit configured to read an image formed on the first sheet conveyed to the main conveyance path;
- an image forming unit configured to form an image on a second sheet;
- a discharge unit configured to discharge the second sheet on which the image is formed by the image forming unit;
- a stacking unit configured to stack the second sheet discharged by the discharge unit;
- a switching unit configured to switch between stacking the second sheet discharged from the discharge unit on the stacking unit or conveying the second sheet discharged from the discharge unit toward the reading unit;
- a conveyance unit configured to convey the second sheet conveyed via the switching unit to the reading unit such that the reading unit reads the image formed on the second sheet by the image forming unit; and
- a control unit configured to control cooling of the second sheet discharged from the discharge unit and conveyed to the reading unit,
- wherein the control unit includes a conveyance control unit configured to cause a conveyance of the second sheet by the conveyance unit to stop through a predetermined cooling time and then to cause the second sheet to be conveyed to the reading unit by the conveyance unit.

* * * * *